(12) United States Patent
Schmidt

(10) Patent No.: US 10,742,089 B2
(45) Date of Patent: Aug. 11, 2020

(54) MOTOR ASSEMBLY WITH SHAFT CLAMP

(71) Applicant: Nidec Motor Corporation, St. Louis, MO (US)

(72) Inventor: Ronald W. Schmidt, Webster Groves, MO (US)

(73) Assignee: Nidec Motor Corporation, St. Louis, MO (US)

( * ) Notice: Subject to any disclaimer, the term of this patent is extended or adjusted under 35 U.S.C. 154(b) by 129 days.

(21) Appl. No.: 15/948,583

(22) Filed: Apr. 9, 2018

(65) Prior Publication Data

US 2019/0312481 A1 Oct. 10, 2019

(51) Int. Cl.
*H02K 5/26* (2006.01)

(52) U.S. Cl.
CPC ........................................ *H02K 5/26* (2013.01)

(58) Field of Classification Search
CPC ....................................................... H02K 5/26
USPC .......................................... 310/91, 418, 419
See application file for complete search history.

(56) References Cited

U.S. PATENT DOCUMENTS

| 1,365,732 | A | * | 1/1921 | Schmid | G11B 15/50 |
| | | | | | 464/47 |
| 3,331,482 | A | * | 7/1967 | Keramas | F16D 13/46 |
| | | | | | 192/95 |
| 4,260,125 | A | * | 4/1981 | Levine | H02K 5/26 |
| | | | | | 248/675 |
| 4,877,984 | A | * | 10/1989 | Colwell | F04B 17/03 |
| | | | | | 310/66 |
| 5,975,480 | A | * | 11/1999 | Schaefer | F16M 7/00 |
| | | | | | 248/651 |
| 2019/0312481 | A1 | * | 10/2019 | Schmidt | H02K 5/26 |

* cited by examiner

*Primary Examiner* — John K Kim
(74) *Attorney, Agent, or Firm* — Hovey Williams LLP

(57) ABSTRACT

A motor assembly broadly includes an electric motor and a clamp. The electric motor includes a motor housing and a shaft rotatably supported relative to the motor housing to rotate about a shaft axis, with part of the shaft being exposed relative to the motor housing. The motor housing includes a mounting base. The clamp is connected between the exposed part of the shaft and the mounting base. The clamp is selectively adjustable to apply a variable off-axis load to the exposed part of the shaft.

12 Claims, 9 Drawing Sheets

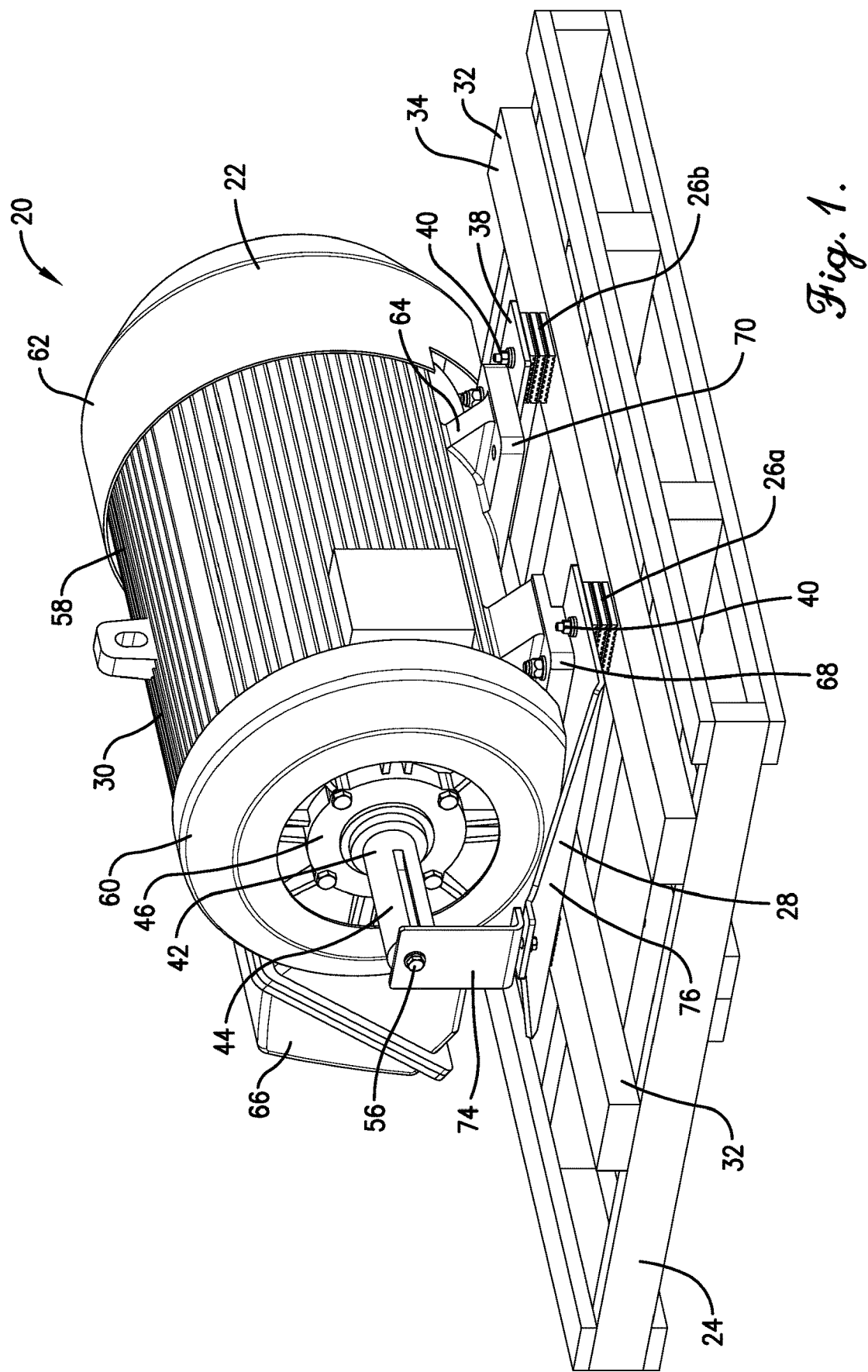

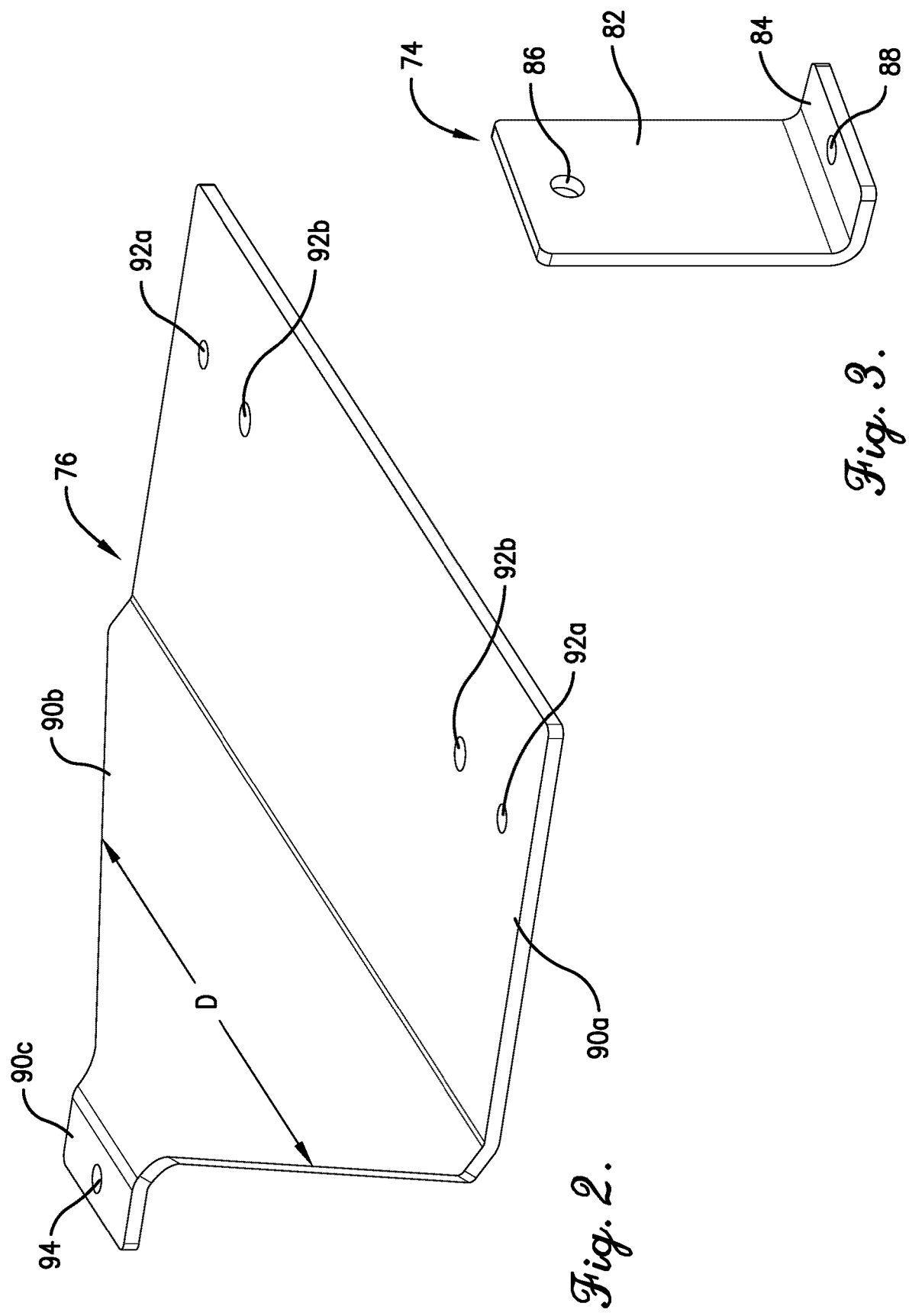

MOTOR ASSEMBLY WITH SHAFT CLAMP

BACKGROUND

1. Field

The present invention relates generally to electric motors. More specifically, embodiments of the present invention concern a motor assembly with an electric motor and a clamp to restrict external loads from causing damage to the motor.

2. Discussion of Prior Art

Electric motors commonly include a housing, a stator fixed within the housing, and a rotor mounted at least partly within the housing to rotate. Rotors are commonly supported for rotation by bearings mounted in the housing. Many conventional rotors tend to be relatively heavy structures (particularly for larger horsepower motors), and such rotors require the use of relatively robust bearings. Furthermore, the weight of prior art rotors is such that external loads during transportation (e.g., excessive impact loads and vibration) can cause damage to the rotor and/or the bearings.

Relatively large electric motors are often transported with motor supports designed to minimize rotor movement due to external loads. In some applications, such electric motors are secured on wooden pallets for transportation. To restrict rotor movement in these applications, an exposed part of the motor shaft is supported by wooden blocks wedged between the shaft and the pallet and fastened to the pallet. However, this method of supporting the shaft is notoriously unreliable because wooden pallets and blocks are known to contract, flex, and break when supporting the exposed shaft. Furthermore, fasteners securing wooden blocks to the underlying pallet are known to inadvertently loosen and permit movement between the block and pallet.

SUMMARY

The following brief summary is provided to indicate the nature of the subject matter disclosed herein. While certain aspects of the present invention are described below, the summary is not intended to limit the scope of the present invention.

Embodiments of the present invention provide a motor assembly that does not suffer from the problems and limitations of the electric motors and motor-carrying structures set forth above.

A first aspect of the present invention concerns a motor assembly that broadly includes an electric motor and a clamp. The electric motor includes a motor housing and a shaft rotatably supported relative to the motor housing to rotate about a shaft axis, with part of the shaft being exposed relative to the motor housing. The motor housing includes a mounting base. The clamp is connected between the exposed part of the shaft and the mounting base. The clamp is selectively adjustable to apply a variable off-axis load to the exposed part of the shaft.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a perspective of a motor assembly constructed in accordance with a preferred embodiment of the present invention, with the motor assembly including a platform, an electric motor, and a clamp, where the clamp interconnects a motor shaft and a mounting base of the motor and includes upper and lower clamp sections and a shiftable fastener;

FIG. 2 is a perspective of the lower clamp section shown in FIG. 1;

FIG. 3 is a perspective of the upper clamp section shown in FIG. 1;

Figure 4:
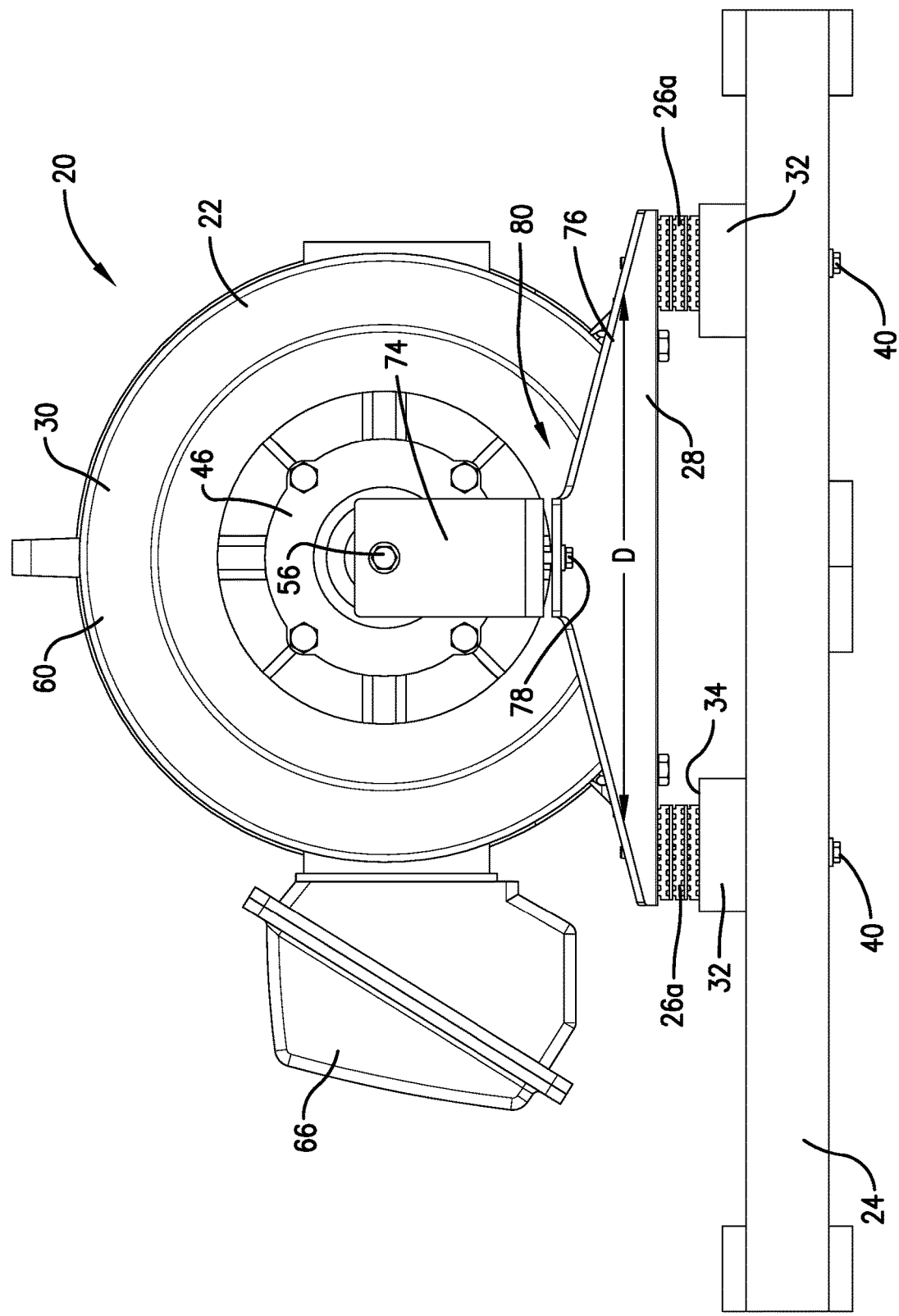
FIG. 4 is a front elevation of the motor assembly shown in FIG. 1, showing the clamp in an unflexed condition where the clamp sections cooperatively form a gap therebetween.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Initially referring to FIGS. 1 and 4, a motor assembly 20 is configured so that an electric motor 22 is supported and protected from excessive loading, particularly during transportation of the electric motor 22. The depicted motor assembly 20 broadly includes the electric motor 22, a platform 24, isolation pads 26a,b, and a clamp 28.

In the usual manner, the platform 24 and isolation pads 26a,b cooperatively provide a support structure that supports the weight of the electric motor 22. At the same time, this support structure minimizes exposure of the motor 22 to external loads and vibration (e.g., external loads and vibration experienced during transportation and storage of the motor 22). As will be discussed, the motor 22 includes a housing 30 with front and rear feet that support the weight of the motor 22. The housing 30 is configured to be removably attached to the platform 24 with fasteners.

Turning to FIGS. 1 and 4-7, the illustrated platform 24 comprises a conventional wooden pallet and includes wooden slats 32 that cooperatively present a generally horizontal upper support surface 34. The support surface 34 is configured to receive the isolation pads 26a,b, with the motor 22 resting on the support surface 34.

Figure 7:
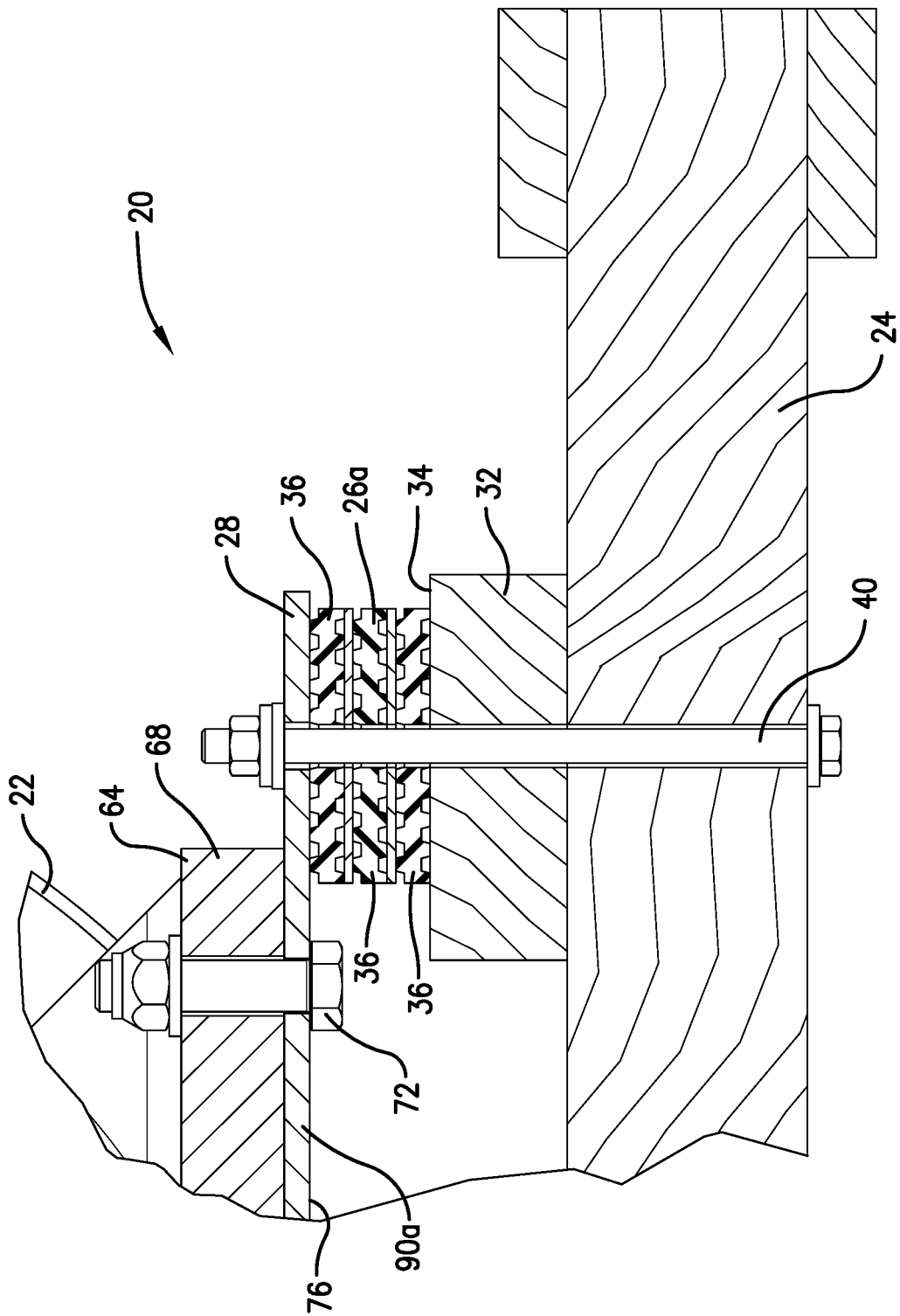
FIG. 7 is a fragmentary cross section of the motor assembly taken along line 7-7 in FIG. 5, showing the mounting base and clamp secured to each other with a fastener, and showing the clamp, isolation pad, and platform secured to each other with another fastener.

Each isolation pad 26a,b preferably includes elastomeric plates 36 stacked in series (see FIG. 7). In the illustrated embodiment, the clamp 28 and a plate 38 are secured to the motor 22. As will be described, the clamp 28 and plate 38 are supported relative to the platform 24 by the isolation pads 26a,b (see FIG. 5). The clamp 28 and plate 38 are secured to the platform 24 by fasteners 40 that extend through the isolation pads 26a,b (see FIGS. 5 and 7).

The principles of the present invention are also applicable where an alternative structure is used to support the motor and restrict the motor from being exposed to excessive loads and vibration. For instance, the support structure could have an alternative isolation mechanism to isolate the motor from various loads (or no isolation mechanism at all).

It will also be appreciated that the platform could be variously configured without departing from the scope of the present invention. For example, the platform could comprise a framework including a metallic material (e.g., carbon steel, aluminum, stainless steel, etc.) or a synthetic resin material. In some alternative embodiments, the platform could have a different orientation relative to horizontal (e.g., where the platform is vertically oriented) and/or relative to the motor. For some aspects of the present invention, the depicted platform could be eliminated entirely.

The electric motor 22 is configured for use in any suitable environment, such as a powered machine. The motor 22 broadly includes a rotor 42 (see FIGS. 1 and 6) and a stator (not shown). The rotor 42 is preferably rotatable about a rotational shaft axis A and has a rotor weight W (see FIG. 6). In a preferred embodiment, the stator at least substantially circumscribes the rotor 42, such that the motor 22 is an inner rotor motor. It is permissible according to some aspects of the present invention, however, for the motor to be an outer rotor motor.

The rotor 42 preferably includes a rotor core (not shown), a plurality of magnets (not shown), and a shaft 44 defining the shaft axis A for the rotor 42. The rotor core and magnets are generally located within the housing 30. The shaft 44 is rotatably supported relative to the motor housing 30 to rotate about the shaft axis A. More specifically, the shaft 44 is rotatably supported by a front bearing 46 (see FIG. 1) and a rear bearing (not shown) of the motor 22. In the preferred embodiment, the rotor weight W is generally shared evenly by the front bearing 46 and the rear bearing so that each bearing carries a bearing load B of one half the rotor weight W (see FIG. 6).

Figure 5:
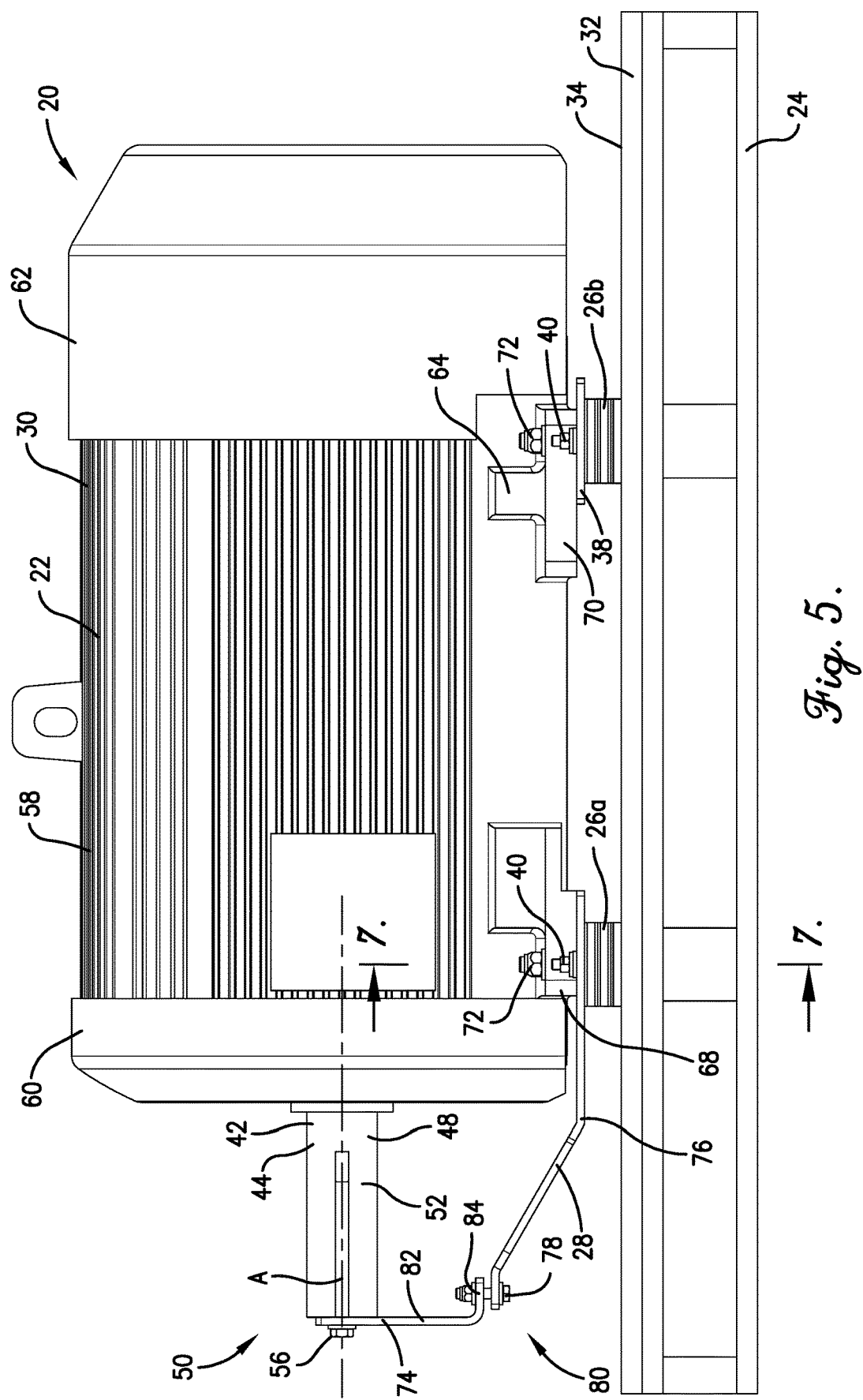
FIG. 5 is a side elevation of the motor assembly shown in FIGS. 1 and 4, depicting the motor supported on the platform with isolation pads.
Figure 6:
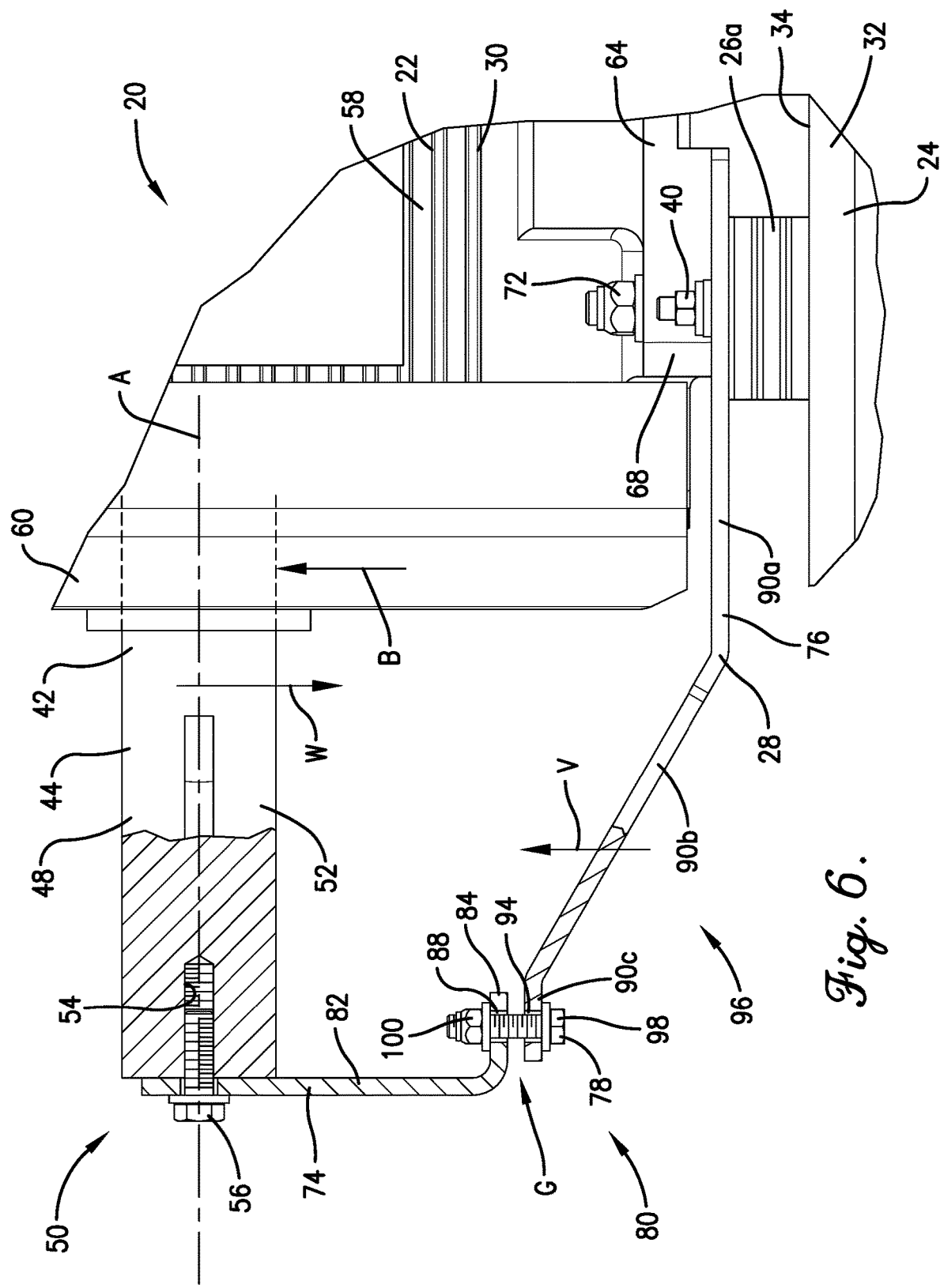
FIG. 6 is an enlarged fragmentary side elevation of the motor assembly similar to FIG. 5, but showing part of the shaft sectioned away to particularly illustrate the upper clamp section fastened to an end of the shaft.

The shaft 44 preferably includes an exposed part 48 that is exposed relative to the motor housing 30 (see FIGS. 5 and 6). In the illustrated embodiment, the exposed part 48 is preferably cantilevered relative to the motor housing 30 such that a free end 50 of the shaft 44 is spaced from the housing 30 (see FIGS. 5 and 6). However, for some aspects of the present invention, the shaft could have an exposed part alternatively located along the length of the shaft (e.g., where the exposed part is spaced between the ends of the shaft and, more optionally, between the bearing supports such that the exposed part is along a non-cantilevered portion of the shaft). The depicted shaft 44 presents a continuous outer shaft surface 52 and a threaded opening 54 to receive a threaded fastener 56 (see FIGS. 5 and 6).

The housing 30 preferably includes a shell 58, a front endshield 60, a rear endshield 62, and a mounting base 64 (see FIGS. 5-7). The shell 58 and the endshields 60 and 62 preferably present an internal motor chamber (not shown) that at least substantially receives the stator and the rotor 42.

In a preferred embodiment, the shell 58 extends generally circumferentially about the stator. It is permissible according to some aspects of the present invention, however, for the shell to extend in such a manner as to provide one or more flat sides, in contrast to the preferred generally cylindrical form, or to be otherwise alternatively shaped.

The front endshield 60 preferably supports the front bearing 46. The rear endshield 62 preferably supports the rear bearing (not shown). The front bearing 46 and the rear bearing preferably cooperatively rotatably support the shaft 44. Alternative or additional bearings, supports, or shaft supports may be provided without departing from the scope of the present invention, however. The endshields 60 and 62 are preferably secured to the shell 58 by means of fasteners (not shown).

The housing 30 also preferably includes a controller can 66 (see FIGS. 1 and 4). In a preferred embodiment, the controller can 66 defines a controller chamber (not shown) that at least substantially houses a motor controller (not shown). Alternative controller locations and/or configurations are permissible, however.

Preferably, the mounting base 64 is configured to rest on the support surface 34 and includes a pair of front mounting feet 68 and a pair of rear mounting feet 70. Each pair of feet 68,70 are generally symmetrical and provide a pair of mounting locations for the motor 22. In particular, each pair of feet 68,70 present a pair of openings (not shown) to receive a corresponding pair of fasteners 72 (see FIGS. 5-7). The fasteners 72 removably secure the feet 68,70 relative to the platform 24 (see FIGS. 5-7). In the illustrated embodiment, the front feet 68 are attached to the clamp 28 with fasteners 72 (see FIG. 7), and the rear feet 70 are attached to the plate 38 with fasteners 72 (see FIG. 5).

Again, the clamp 28 and plate 38 are supported on the platform 24 by the isolation pads 26a,b and secured to the platform 24 by fasteners 40 that extend through the isolation pads 26a,b. However, the mounting base could be alternatively configured and/or attached relative to the platform without departing from the scope of the present invention.

Although the depicted clamp 28 is directly attached to only the front feet 68, the clamp could be configured for attachment to both the front and rear feet. Such an alternative clamp fastening arrangement could suitably reinforce the clamp (e.g., to permit resilient bending of the clamp).

Turning to FIGS. 2-10, the illustrated clamp 28 is selectively adjustable to apply a variable off-axis load L (see FIGS. 9 and 10) to the exposed part 48 of the shaft 44. Although the load L is primarily applied in a direction orthogonal to the axis A, it will be appreciated that some load could also be applied along the axis A. As will be explained below, the clamp 28 is connected between the exposed part 48 of the shaft 44 and the mounting base 64. The clamp 28 is preferably configured to apply the off-axis load L to restrict undue motor wear or damage caused by other external loads, such as impact or vibrational loads experienced by the motor 22 (which might occur, for example, during transportation of the motor 22).

Figure 8:
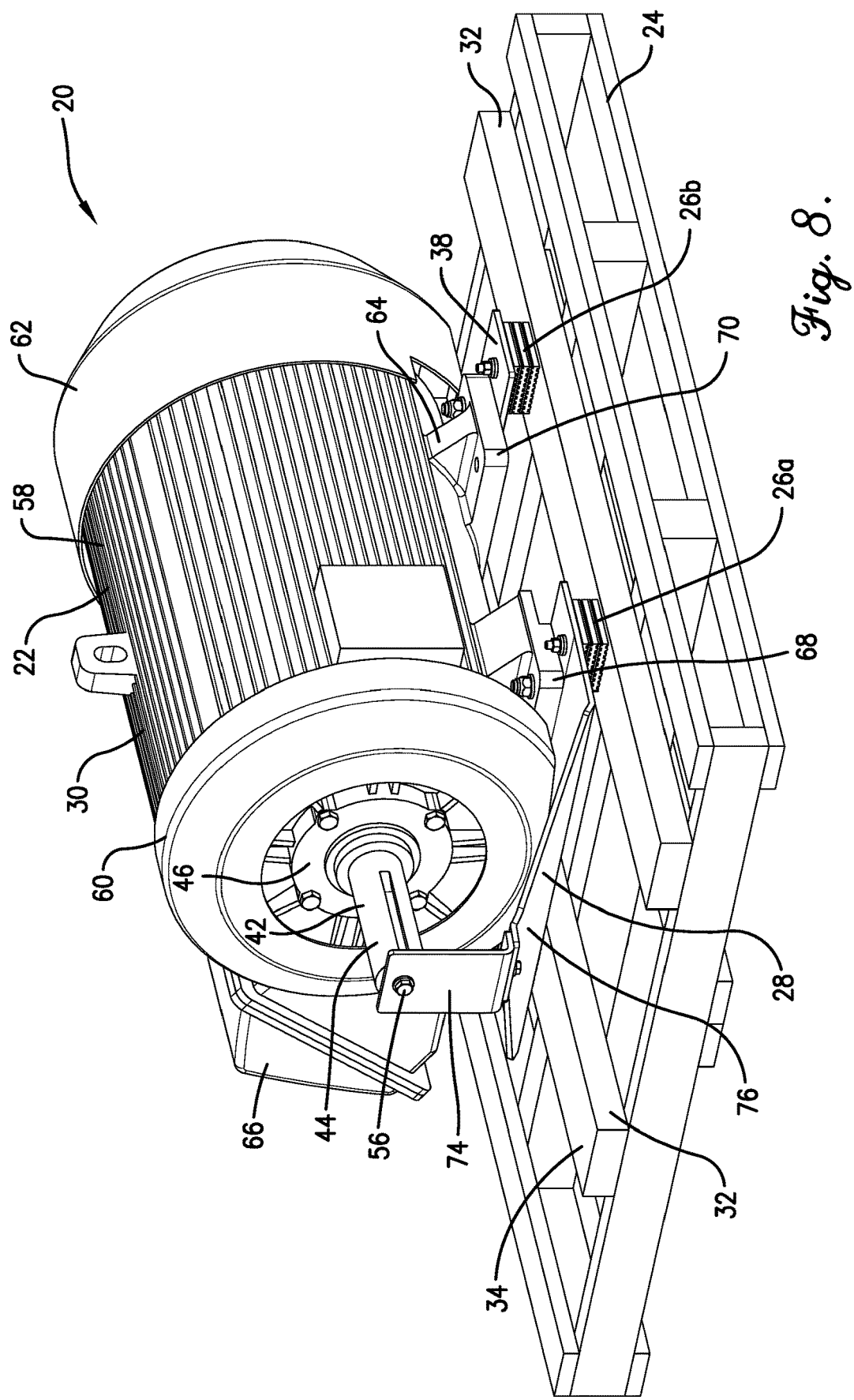
FIG. 8 is a perspective of the motor assembly similar to FIG. 1, but showing the clamp shifted into a flexed condition by the shiftable fastener where the clamp sections are urged into engagement with each other by the fastener.
Figure 9:
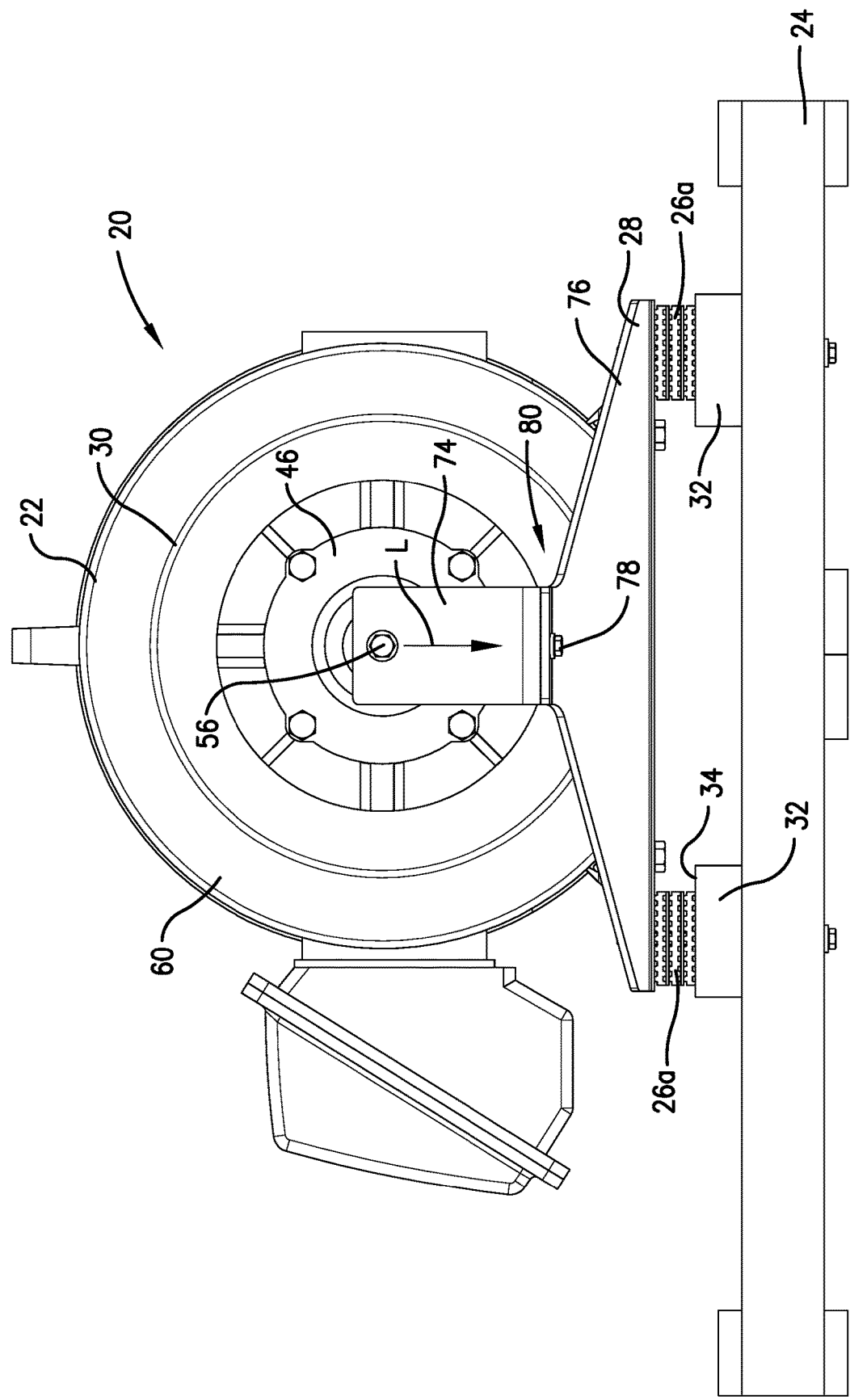
FIG. 9 is a front elevation of the motor assembly similar to FIG. 4, but showing the clamp in the flexed condition as depicted in FIG. 8.
Figure 10:
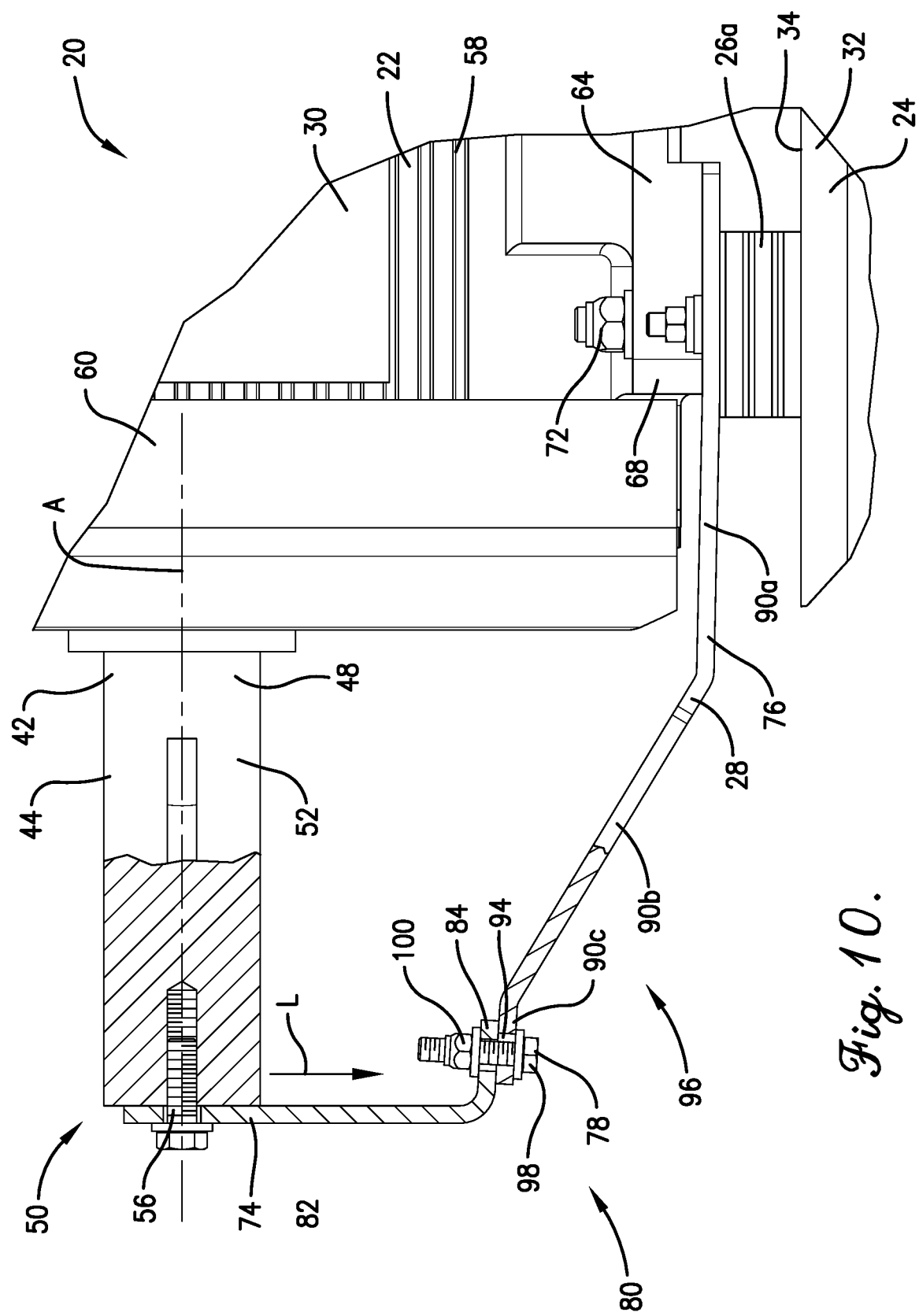
FIG. 10 is an enlarged fragmentary side elevation of the motor assembly similar to FIG. 6, but showing the clamp in the flexed condition as depicted in FIGS. 8 and 9.

Preferably, the clamp 28 is configured to yieldably urge the exposed part 48 of the shaft 44 toward the mounting base 64 when the clamp 28 is in a flexed condition (see FIGS. 8-10). The load L preferably ranges from about the amount of the bearing load B to about three times the amount of the bearing load B. More preferably, the load L is about two times the amount of the bearing load B. However, for certain aspects of the present invention, the load L could also fall outside of the preferred range without departing from the scope of the present invention.

Furthermore, the clamp could be configured to provide an off-axis load in an alternative direction. For some aspects of the present invention, the clamp may apply at least some load in the axial direction, whether or not load is also applied off-axis.

The clamp 28 preferably includes upper and lower clamp sections 74,76 and a shiftable fastener 78 (see FIGS. 2-6). As will be described in greater detail, the clamp 28 also preferably includes an adjustable joint 80 at which the clamp sections 74,76 are attached to each other (see FIGS. 4 and 5). The joint 80 presents a variable gap G between clamp sections 74,76 that permits adjustment of the joint 80. More particularly, the joint 80 is adjustable to shift the clamp 28 between an unflexed condition (see FIGS. 4-6) and the flexed condition (see FIGS. 8-10). In the illustrated embodiment, the gap G is at a minimum (or zero) size in the flexed condition and at a maximum size in the unflexed condition.

In general, adjustment of the joint 80 serves to vary the off-axis load L applied to the exposed part 48 of the shaft 44. In the illustrated embodiment, the off-axis load L applied to the shaft 44 by the clamp 28 preferably increases as the clamp 28 is shifted to the flexed condition. In the flexed condition, the load L is generally at a maximum value. It is also within the ambit of the present invention where the load applied by the clamp 28 is not at a maximum value in the flexed condition. In some alternative embodiments, the load applied by the clamp may not increase as the clamp is shifted to the flexed condition. For instance, for at least part of the clamp movement from the unflexed condition to the flexed condition, the amount of load applied by the clamp could remain substantially constant or could decrease.

The upper clamp section 74 is preferably removably attached to the exposed part 48 of the shaft 44, as will be discussed. In the illustrated embodiment, the upper clamp section 74 comprises a unitary angular plate with upper and lower portions 82,84 (see FIGS. 3 and 6) angled relative to one another at an angle of about ninety degrees (90°). The upper and lower portions 82,84 preferably present openings 86,88 (see FIG. 3), respectively. The opening 86 is configured to receive fastener 56, and the opening 88 is configured to receive fastener 78 (see FIG. 6).

It will also be appreciated that the upper clamp section 74 could be variously configured consistent with the principles of the present invention. For instance, the portions 82,84 could be alternatively sized and/or oriented relative to one another.

The illustrated plate of the upper clamp section 74 preferably comprises a carbon steel material, but could alternatively or additionally include other metal materials, such as stainless steel or aluminum, or a non-metal material, such as a synthetic resin.

Preferably, the upper clamp section 74 is removably mounted on the free end 50 of the shaft 44 by extending the fastener 56 through the opening 86 and threading the fastener 56 into the opening 54 of the shaft 44 (see FIG. 6). The fastener 56 can be tightened to frictionally engage the upper clamp section 74 and restrict rotation of the upper clamp section 74 relative to the shaft 44. Similarly, the fastener 56 can be loosened to permit rotation of the upper clamp section 74 relative to the shaft 44.

Although the upper clamp section 74 is preferably attached to the shaft 44 according to the illustrated arrangement, the upper clamp section could be alternatively attached without departing from the scope of the present invention. For instance, an alternative clamp could be attached at another location along the exposed part of the shaft. It is noted, however, that the upper clamp section 74 is preferably attached adjacent the free end 50 of the shaft 44 to maximize the moment applied to the shaft 44.

Furthermore, for some aspects of the present invention where the exposed part of the shaft is alternatively located along the length of the shaft (e.g., where the exposed part is spaced between the ends of the shaft), an alternative clamp could be correspondingly attached to the exposed part. In one such alternative embodiment, the upper clamp section could present a relatively larger opening sized to receive the shaft (e.g., where the upper clamp section is slidably mounted on the outer shaft surface). In some alternative embodiments, the upper clamp section could be secured to the shaft with an alternative fastener or with no fastener at all.

The lower clamp section 76 is preferably removably attached to the mounting base 64. In the illustrated embodiment, the lower clamp section 76 comprises a unitary angular plate with generally planar segments 90a,b,c angled relative to one another (see FIGS. 2 and 6). The segment 90a preferably presents openings 92a to receive respective fasteners 40 and openings 92b to receive respective fasteners 72 (see FIGS. 2 and 6). The segment 90c preferably presents an opening 94 to receive the fastener 78 (see FIGS. 2 and 6).

The lower clamp section 76 defines a lateral width dimension D (see FIGS. 2 and 4) that extends transverse to the shaft axis A. The ratio of width dimension D for segment 90a to the width dimension D for segment 90c preferably ranges from about 2:1 to about 8:1 and, more preferably, is about 6:1.

In the illustrated embodiment, the width dimension D preferably tapers along the segment 90b toward the segment 90c and the joint 80. However, the segments 90a,b,c could be alternatively shaped within the ambit of the present invention.

It will also be appreciated that the lower clamp section 76 could be variously configured consistent with the principles of the present invention. For instance, the segments could be alternatively shaped and/or oriented relative to one another.

The illustrated plate of the lower clamp section 76 comprises a carbon steel material, but could alternatively or additionally include other metal materials, such as stainless steel or aluminum, or a non-metal material, such as a synthetic resin.

As mentioned above, the clamp 28 is supported relative to the platform 24 by the isolation pads 26a,b (see FIG. 5). Preferably, the lower clamp section 74 is removably mounted on the platform 24 by positioning the segment 90a on isolation pads 26a and extending the fasteners 40 through the segment 90a of the lower clamp section 74, isolation pads 26a, and slats 32 of the platform 24. Again, the lower clamp section 74 is fastened to the motor 22 with fasteners 72.

The plate 38 is also supported relative to the platform 24 by the isolation pads 26a,b (see FIG. 5). The plate 38 is secured to the platform 24 by fasteners 40 that extend through the isolation pads 26a,b (see FIGS. 5 and 7).

With the lower clamp section 74 mounted on the platform 24, an elongated portion 96 of the lower clamp section 74 extends from the mounting base 64 along the shaft axis A and is cantilevered relative to the mounting base 64 (see FIGS. 6 and 10). This cantilevered mounting arrangement permits the elongated portion 96 to swing (as the clamp section 74 elastically flexes) in a vertical off-axis direction V, corresponding to the unflexed and flexed conditions of the clamp (see FIG. 6).

The principles of the present invention are also applicable where the clamp is alternatively supported relative to the motor. In some alternative embodiments, the clamp could be attached to the mounting base without being attached to the platform (e.g., where the motor assembly is devoid of a platform). For some aspects of the present invention, the clamp could be spaced from the mounting base (for example, where the clamp is attached directly to a platform).

In the unflexed condition, the lower clamp section 74 is preferably positioned so that the clamp sections 74,76 are adjacent to one another but spaced apart. It is also within the scope of the present invention where the clamp sections have an alternative relative placement in the unflexed condition. For instance, in some alternative embodiments, the clamp sections could be in contact with one another in the unflexed condition.

The depicted clamp 28 preferably has a pair of clamp sections 74,76. In some alternative embodiments, the clamp could have more than two clamp sections. However, in other alternative embodiments, the clamp could comprise a single, unitary clamp section.

Again, the adjustable joint 80 is adjustable to shift the clamp 28 between the unflexed condition (see FIGS. 4-6) and the flexed condition (see FIGS. 8-10). In the illustrated embodiment, the off-axis load L applied to the shaft 44 by the clamp 28 preferably increases as the clamp 28 is shifted to the flexed condition.

The illustrated joint 80 is cooperatively formed by the clamp sections 74,76 and the fastener 78. The depicted fastener 78 comprises a removable threaded fastener that is removably secured to the clamp sections 74,76. Preferably, the fastener 78 includes a threaded bolt 98 and nut 100 that are in removable threaded engagement with each other (see FIGS. 6 and 10). However, in alternative embodiments, the fastener 78 could be alternatively configured and/or attached to the clamp sections 74,76.

When installing the clamp 28, the clamp sections 74,76 are installed by attaching the clamp sections 74,76 to the shaft 44 and the mounting base 64, respectively. In some instances, the clamp sections 74,76 may be installed while being detached (i.e., without being attached to each other by the fastener 78). However, it will be appreciated that the clamp sections 74,76 could also be installed while being attached to each other by the fastener 78 (e.g., where the fastener 78 is adjusted according to the unflexed position). Once installed, the fastener 78 can be attached to the clamp sections 74,76 in the unflexed position. Again, in some instances, it may be possible to install the clamp sections 74,76 while connected to each other by the fastener 78, even where the clamp 28 is flexed to some degree out of the unflexed position.

Shifting of the fastener 78 corresponds at least to some degree with swinging of the elongated portion 96. The elongated portion 96 of the lower clamp section 76 is configured to swing in the vertical off-axis direction as the clamp 28 shifts between the unflexed condition and the flexed condition.

For instance, the fastener 78 is operable to urge the clamp sections 74,76 toward each other when the clamp is placed in the flexed condition. In particular, the clamp sections 74,76 are urged toward each other by threading the nut 100 toward the head of the bolt 98. In the flexed condition, the bolt 98 and nut 100 cooperatively hold the clamp sections 74,76 in engagement with each other.

Similarly, the nut 100 can be threaded away from the head of the bolt 98 to permit the clamp sections 74,76 to move away from one another, corresponding to the clamp being placed in the flexed condition. For instance, the nut 100 can be threaded away from the head of the bolt 98 so that the clamp 28 returns to the unflexed condition. Furthermore, the nut 100 can be entirely detached from the bolt 98 so as to detach the clamp sections 74,76 from each other.

Although the adjustable joint 80 is cooperatively provided by the clamp sections 74,76 and fastener 78, alternative embodiments of an adjustable joint 80 could be provided without departing from the scope of the present invention. For instance, the clamp could cooperate with the shaft to cooperatively form an alternative adjustable joint. In one such alternative embodiment, the opening of the upper clamp section could be slotted to slidably receive a fastener and permit the clamp to be secured to the shaft in one of a range of positions. A slotted clamp could also have a unitary clamp construction (instead of having detachable clamp sections). In other alternative embodiments, the clamp could cooperate with the mounting base to form the adjustable joint.

In use, the clamp is installed by attaching the clamp sections 74,76 to the shaft 44 and the mounting base 64, respectively. As explained above, the clamp sections 74,76 may be installed while being detached from each other or attached to each other by the fastener 78. If the clamp sections are installed while detached from each other, the fastener 78 is attached to the clamp sections 74,76 while the clamp is in the unflexed position.

The clamp 28 can be shifted to the flexed position to apply the off-axis load L to the shaft 44. In this manner, the load L is applied to secure the rotor and restrict external loads from causing damage to the rotor and the bearings.

In particular, the clamp sections 74,76 are urged toward each other by threading the nut 100 toward the head of the bolt 98. In the flexed condition, the bolt 98 and nut 100 cooperatively hold the clamp sections 74,76 in engagement with each other.

Similarly, the nut 100 can be threaded away from the head of the bolt 98 to permit the clamp sections 74,76 to move away from each other. For instance, the nut 100 can be threaded away from the head of the bolt 98 so that the clamp 28 returns to the unflexed condition. Furthermore, the nut 100 can be entirely detached from the bolt 98 so as to detach the clamp sections 74,76 from each other.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A motor assembly comprising:
   an electric motor including a motor housing and a shaft supported relative to the motor housing, with part of the shaft being exposed relative to the motor housing,
   said motor housing including a mounting base; and
   a clamp connected to the exposed part of the shaft and connected to the mounting base, with the clamp extending between the exposed part of the shaft and the mounting base,
   said clamp being selectively adjustable to apply a variable off-axis load to the exposed part of the shaft,
   said clamp including adjustably interconnected first and second clamp sections,
   said first clamp section attached to the exposed part of the shaft and said second clamp section connected to the mounting base,
   said clamp including an adjustable joint at which the first and second clamp sections are attached to each other, with adjustment of the joint serving to vary the off-axis load applied to the exposed part of the shaft,
   said joint being adjustable to shift the clamp between an unflexed condition and a flexed condition, with the off-axis load increasing as the clamp is shifted to the flexed condition,
   said second clamp section including an elongated portion extending from the mounting base along the shaft axis,
   said elongated portion swinging in an off-axis direction as the clamp shifts between the unflexed condition and the flexed condition.

2. The motor assembly as claimed in claim 1,
   each of said clamp sections including an angular plate,
   said exposed part of the shaft being cantilevered relative to the motor housing such that a free end of the shaft is spaced from the housing,
   said first clamp section being fastened to the shaft at or adjacent the free end thereof.

3. The motor assembly as claimed in claim 1,
   said clamp being configured to yieldably urge the exposed part of the shaft toward the mounting base when the clamp is in the flexed condition.

4. The motor assembly as claimed in claim 3,
   said joint being cooperatively formed by the clamp sections and a shiftable fastener operable to urge the clamp sections toward each other into the flexed condition.

5. The motor assembly as claimed in claim 4,
   said clamp sections being removably secured to each other by the fastener.

6. The motor assembly as claimed in claim 1,
   said elongated portion defining a width dimension transverse to the shaft axis,
   said width dimension tapering toward the adjustable joint.

7. The motor assembly as claimed in claim 1,
   said joint being cooperatively formed by the clamp sections and a shiftable fastener operable to urge the clamp sections toward each other into the flexed condition, with shifting of the fastener corresponding at least to some degree with swinging of the elongated portion.

8. The motor assembly as claimed in claim 1,
   said exposed part of the shaft being cantilevered relative to the motor housing such that a free end of the shaft is spaced from the housing.

9. The motor assembly as claimed in claim 1, further comprising:
   a platform,
   said motor being supported by the platform.

10. The motor assembly as claimed in claim 9,
    said platform presenting a generally horizontal support surface,
    said mounting base resting on the support surface.

11. The motor assembly as claimed in claim 9,
    said mounting base including a plurality of feet,
    said feet being secured relative to the platform.

12. The motor assembly as claimed in claim 1,
    said joint being cooperatively formed by the clamp and a shiftable fastener operable to removably secure the clamp in the flexed condition.

* * * * *